Oct. 15, 1968  J. F. EMERSON ET AL  3,406,321

FRACTIONAL SPEED SYNCHRO SYSTEM

Filed May 19, 1965

JOHN F. EMERSON
CHARLES W. LANG
INVENTORS

BY

*Francis R. Masselle*

ATTORNEY

United States Patent Office 3,406,321
Patented Oct. 15, 1968

3,406,321
FRACTIONAL SPEED SYNCHRO SYSTEM
John F. Emerson, Hackensack, and Charles W. Lang, Passaic, N.J., assignors to General Precision Inc., Little Falls, N.J., a corporation of Delaware
Filed May 19, 1965, Ser. No. 456,960
15 Claims. (Cl. 318—18)

ABSTRACT OF THE DISCLOSURE

In a synchro system comprising a control transmitter (CX) and a control transformer (CT), the stator windings in at least one of the units are unbalanced in the sense that one of the windings has a different number of effective turns compared to the remaining two windings which have the same number of effective turns. The effect of the unbalance stator winding is to produce a non-integral relationship between CX–CT rotor displacement over a preselected limited range, say, ±150. After determining the electrical position error occuring over this limited range of rotor displacement, the unbalanced rotor and stator windings are distributed to introduce space harmonics effective to minimize the residual electrical error occuring over such limited range of rotor displacement.

---

This invention relates generally to dynamoelectric devices and, in particular, to electrical servo systems comprising a control transmitter and control transformer, and to methods of designing such systems.

Servo systems are well known and widely used in the art for remote control and/or indication. The present invention relates to a particular type of servo system which includes a control transmitter (or CX) and a control transformer (or CT). The invention is also applicable to systems which include additional components, e.g., a differential transmitter; however, for the sake of simplicity, this description will be confined to a basic CX–CT system.

As is well known in the art, the CX and CT in a synchro system each have multi-phase stator windings and respective rotors; the rotor of the CX is excited with AC and the respective stator windings are electrically interconnected so that displacement of the CX rotor from a reference or null position induces a voltage across the rotor of CT. The voltage across the CT rotor is applied to the control windings of a servomotor mechanically coupled to drive the CT rotor; as a result the servomotor turns the CT rotor to a position which nulls the voltage thereacross, which position corresponds to that of the CX rotor.

From the foregoing brief summary of the art to which the invention pertains, it will be appreciated that the rotor of the CT closely follows the rotor of the CX so that a 90 degree (for example) displacement of the latter produces a corresponding 90 degree displacement of the former. In other words, the CX and CT are effectively coupled (electrically) in a one-to-one drive ratio.

With the foregoing state of the art in view, it is the fundamental object of the present invention to provide a servo system in which the drive ratio between the CX and CT is not an integer. For ease of reference, the invention is termed a fractional speed synchro or servo system.

Another object of the present invention is to provide a fractional speed servo system which employs components which may have the same size and external configuration as conventional components and differ therefrom only in the winding distribution.

A still further object is the provision of a fractional speed servo system characterized by a very small position error.

To the accomplishment of these and further objects, the invention contemplates a servo system comprising a synchro-type control transmitter unit, having a rotor carrying an input winding and a stator carrying distributed multi-phase output windings, and a synchro-type control transformer having a rotor and a stator. The stator of the CT carries distributed multi-phase input windings connected to respective output windings of the transmitter unit. The stator windings of at least one of the units are unbalanced by reason of differences in the number of effective turns thereof so as to achieve a predetermined ratio of CX to CT rotor displacement which is not an integer; the windings are distributed to introduce into the effective voltages, governing rotation of the CT rotor, space harmonics effective to mitigate electrical errors occurring in such voltages.

The invention also contemplates a method of designing a fractional speed synchro system as described in the preceding paragraph which comprises the steps of unbalancing the output voltages of the transmitter unit stator by changing the effective turns of at least one phase of the windings relative to the others; plotting, for a limited range of CX rotor displacement, a curve of CT electrical position error vs. CX unit mechanical rotor angle and determining therefrom the error in cycles for a complete revolution of the CX rotor; and distributing the windings of the CX unit to introduce into the output voltages thereof a space harmonic adaped to produce an electrical error of substantially equal amplitude and opposite phase as compared to the error determined from the plotted curve.

Additional objects of the invention, its advantages, scope and the manner in which it may be practiced will be more fully apparent to persons conversant with the art from the following description of a preferred embodiment thereof taken in conjunction with the subjoined claims and annexed drawings in which:

FIG. 1 illustrates an equivalent circuit diagram of a servo system (omitting the amplifier and servomotor) which is equally valid to represent conventional servo mechanisms as well as those contemplated by the present invention. It will be understood as this description proceeds that the mechanical details of the synchro units are not germane to the invention.

Figure 1:
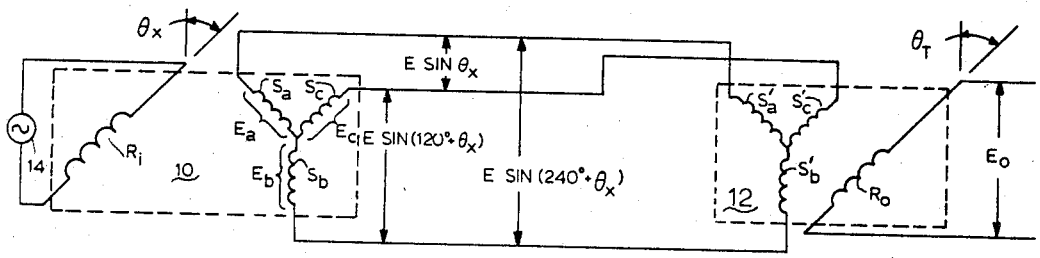
FIG. 1 is an equivalent circuit diagram of the synchro portion of a servo system.

In FIG. 1, reference numeral 10 designates at CX and reference numeral 12 a CT; these units are quite similar, both electrically and mechanically. CX 10 has three Y-connected stator windings $S_a$, $S_b$ and $S_c$ connected to three respective Y-connected stator windings $S_a'$, $S_b'$ and $S_c'$ of CT unit 12. CX 10 also includes a rotor winding $R_i$ inductively coupled to stator windings $S_a$, $S_b$, $S_c$ and connected across a source of excitation potential 14. Similarly, CT unit 12 includes a rotor winding $R_0$ inductively coupled to stator windings $S_a'$, $S_b'$ and $S_c'$.

As alluded to previously, the CT rotor (not shown) which carries winding $R_0$ is mechanically coupled to the system (e.g., the servomotor, not shown) under the control of the servo mechanism and, therefore, while freely rotatable with respect to the CT stator is not otherwise free to turn. Rotor winding $R_0$ delivers an output voltage $E_0$ which is customarily amplified and delivered to a servomotor (not shown), which is capable of delivering a useful output torque, and is also connected to drive the rotor of the CT. Thus, in operation, when the CX rotor is displaced from a position in which the system is at null, by an angle $\theta_x$, an output voltage $E_0$ is generated in the winding $R_0$ of the CT unit which is proportional to the difference in angular position between CX rotor winding $R_1$ and CT rotor winding $R_0$. The output voltage $E_0$ energizes the servomotor which operates to turn rotor $R_0$ through an angle $\theta_t$ equal to $\theta_x$ and thus eliminate the difference in rotor positions. (At this juncture it should be noted with respect to references to FIG. 1 that, while the CT and CX windings are shown in physical parallelism, the CT rotor is at its null position when $\theta_t = \theta_x + 90°$, i.e., the system is in equilibrium at null, when the relative positions of the CX and CT rotors differ by 90°.)

A synchro CX can be considered a variable coupling transformer having a single phase input and a three phase (in space) output. The amplitude of the output voltages vary as a function of the sine of the angle $\theta_x$ as modified by the appropriate space phase angle, thus: $E \sin \theta_x$, $E \sin (\theta_x + 120$ degrees$)$, $E \sin (\theta_x + 240$ degrees$)$. The accuracy of the control transmitter is dependent upon the relative magnitudes of its output voltages $E_a$, $E_b$, $E_c$.

In a conventional servo system, the three output voltages $E_a$, $E_b$, $E_c$ ideally have the same scale factor and, in addition, are a sinusoidal function of shaft angle.

Inasmuch as servo systems in accordance with the present invention would have the same structure and mechanical configuration as conventional servo systems, no illustration or description of an actual physical embodiment of the invention is necessary. The present invention resides in the winding characteristics employed in the synchros and in the method of designing such windings. By way of example, the invention will be described with reference to a particular servo system in which the ratio of the angular displacement of the synchro CT to the displacement of the CX rotor is a particular value, viz., 0.8.

In contrast to the situation in conventional synchro control transmitters wherein the attainment of a very precise balance of the output voltages of the respective phases is a prime desideratum, in the system contemplated by the present invention the output voltage of the synchro transmitter unit is intentionally unbalanced by making one leg of the Y-connected stator "longer" than the other two. In other words, the scale factor of one phase is increased. By proper selection of the degree of unbalance, which is controlled by adjustment of the number of effective turns of the stator windings, the desired "fractional" relationship between the displacement of the CX rotor and CT rotor can be attained over a limited range of rotation; the range varies with the speed and accuracy desired and, to the extent that it affects accuracy, the number of "teeth" or slots containing the synchro's windings. Even over a small range of rotation, e.g., 15 degrees, a relatively large inherent error is exhibited as will be seen from FIG. 2. In a manner to be described presently, this error is mitigated by distributing the windings in such a way as to introduce space harmonics into the output voltages of the CX which harmonics produce errors of substantially equal amplitude but opposite phase with respect to the inherent error shown in FIG. 2.

Turning then to a description of the particular application of these general principles to the assumed example, and with continued reference to FIG. 1, the maximum output voltage (the scale factor) of the $S_b$ phase is made larger than the maximum output voltages of phases $S_a$ and $S_c$, which are equal to each other. This is accomplished simply by having a larger number of effective turns in the $S_b$ phase as compared to $S_a$ and $S_c$. As a result, the maximum output voltages $E_a$ and $E_c$ are equal and less than $E_b$. It follows that $$\frac{E_b}{E_a} = \frac{E_b}{E_c} = k$$

The inherent electrical error of a control transmitter having unbalanced output voltages, as measured by means of a proportional voltage bridge, is given by the following equation which neglects the effects of higher order space harmonics:

(1)
$$\Delta\theta = \frac{(K+\frac{1}{2}) \sin \alpha \cos \theta - 3/2 \cos \alpha \sin \theta}{(K+\frac{1}{2}) \sin \alpha \sin \theta + 3/2 \cos \alpha \cos \theta}$$

where:

$\Delta\theta$ is the electrical error in radians

K is the voltage ratio defined hereinabove $\theta$ is the angular (mechanical) position of the transmitter unit rotor $\alpha$ is the correlative electrical angle sought to be defined by the output voltages of the transmitter unit (i.e., a fraction of $\theta$ and, in the assumed example, equal to $.8\theta$).

Figure 2:
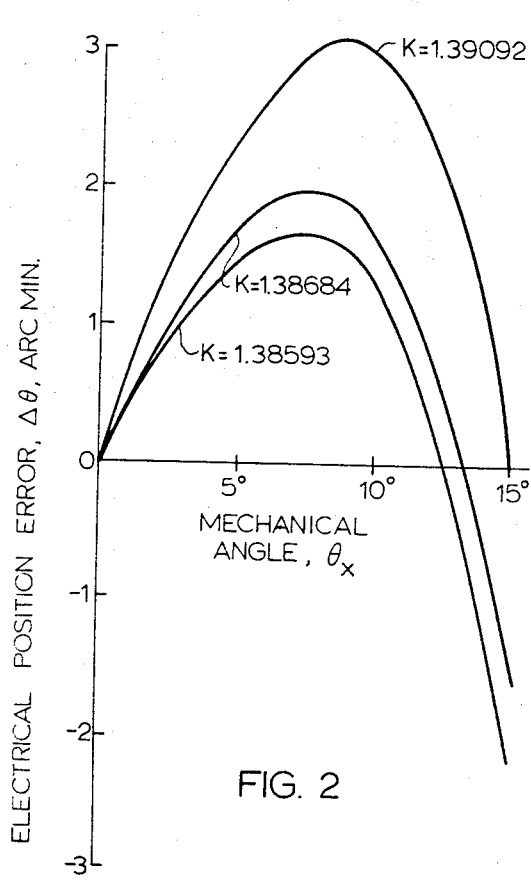
FIGS. 2 and 3 are plotted data referred to in the description of the invention and utilized in the design of servo systems in accordance with the invention.

The curve of Equation 1 is plotted for several judiciously selected values of K as shown in FIG. 2. From FIG. 2 it will be seen that, if the inherent electrical error is set to zero at one limit of the desired operating range (15 degrees in the assumed example), the maximum error is approximately 3.1 arc minutes. It will also be noted from FIG. 2 that the error curve resembles one-half cycle of a sine wave. This corresponds to twelve cycles over one complete revolution and, in accordance with the present invention, a twelve-cycle compensation is introduced into control transmitter 10 having the same amplitude and opposite phase as compared to the error curve shown in FIG. 2. As is known in the art, a twelve-cycle harmonic in the error curve can be achieved by generating an 11 and/or a 13 cycle space harmonic by adjustment of the winding distribution. In the assumed example, an 11 cycle harmonic was used.

The cumulative inherent electrical error of the control transmitter resulting from the combined effect of the unbalance in output voltage and the presence of a voltage space harmonic is approximately given by the following equation:

(2)
$$\Delta\theta = \frac{[(K+\frac{1}{2}) \sin \alpha \cos \theta - 3/2 \sin \theta \cos \alpha] + K_{11}[(K+\frac{1}{2}) \cos y\theta \sin \alpha + 3/2 \sin y\theta \cos \alpha]}{[(K+\frac{1}{2}) \sin \alpha \sin \theta + 3/2 \cos \alpha \cos \theta]}$$

wherein $y$ = the order of the space harmonic (11 in the assumed example).

Equation 2 is plotted for various values of K and $K_{11}$ and the values selected which yield the most favorable-appearing error characteristic. In the assumed example, these values were $K = 1.39416$ and $K_{11} = -.000942$. The curve corresponding to the selected values of K and $K_{11}$ is shown at A in FIG. 3 from which it will be seen that the maximum inherent electrical error is thus reduced to approximately .5 arc minutes.

The rotor and stator winding distributions, required to produce the desired value of $K_{11}$, while producing a minimum of other unwanted harmonics, can be calculated by known methods. In this connection, it should be noted that as $K_{11}$ is proportional to the eleventh space harmonic component of the output voltage, it is proportional to the product of the rotor and stator coupling factors. Consequently, in theory, an infinite number of rotor and stator winding distributions are possible whose eleventh harmonic coupling factors will produce a product of the required value while producing a minimum of other unwanted harmonics. The number is rendered finite, however, by considering only whole numbers of turns. In practice, a number of acceptable rotor and stator winding distributions was determined by use of a digital computer and one selected on the basis of practicality (i.e., no negative turns, high fundamental coupling factor).

Many times it will be found that when the unit is actually constructed the calculated optimum values of K and $K_{11}$ may not agree precisely with the optimum values determined by test of the unit. Additional adjustments may be necessary or desirable to correct the disparity and also to compensate for the effects of load. These final adjustments are made by process of trial and error.

In addition to modifying the adjustment to K and $K_{11}$ that may be required for optimum performance under a no-load condition, the effects of electrical load are also reflected in the system null voltage. This effect is overcome by "balancing" the source impedance as seen looking back into the different output windings. This may be accomplished by puilding a prototype system and adding resistance to at least one of the transmitter unit stator phases until the system's fundamental null voltage is minimized. The added resistance is then incorporated into the production units by using higher resistance (smaller diameter) wire in the affected phases.

The winding distribution selected to introduce the winding harmonic correction (eleventh harmonic in the assumed example) inevitably introduces harmonics of higher order and it is also inevitable that certain of the higher order harmonics in the stator winding will coincide with like harmonics in the rotor winding. To confine the coinciding harmonics to the highest order (and, therefore, least amplitude) possible, the skew angle of the winding is adjusted to minimize the lowest order harmonics common to both the rotor and stator except the eleventh.

By way of further refinement of the accuracy of the system, any residual error can be reduced by further adjustment of the winding distribution (i.e., by a repetition of the technique already explained) to introduce an additional harmonic error equal in amplitude and opposite in phase to the residual error.

To insure a complete understanding of the invention, including factors governing adjustment of the skew angle and refinement of the residual errors, the winding characteristics of a particular exemplary CX will now be described.

The unit comprises a 16-slot, 2-phase rotor (only one phase energized) and a 21-slot, 3-phase stator. The rotor winding distribution, prior to the addition of the eleven cycle winding harmonic, produced space harmonics of the order of $(kS_R \pm 1)$ where $k$ equal 1, 2, 3, 4, 5, and $S_R$ is the number of rotor slots. All other harmonics with the exception of the fundamental were substantially zero. The stator winding distribution, prior to the addition of the eleven cycle winding harmonic correction, produced space harmonics of the order of $(kS_S \pm 1)$ where $k$ equal 1, 2, 3, 4, 5 and $S_S$ is the number of stator slots. All other harmonics except the fundamental were substantially zero.

The lowest order space harmonic common to both rotor and stator is the 127th voltage or winding harmonic (neglecting the effects of skew angle). This voltage harmonic produces a 126 cycle error harmonic when the transmitter unit is tested by means of a proportional voltage bridge.

With the CX rotor winding distribution adjusted to generate the 12 cycle error harmonic correction, voltage harmonics in space are produced in the order of 5, 15, 17, 21, 27, 31, 33, 37, 43, 47, 49, 53 and higher, in addition to the fundamental and 11 cycle space harmonic. The stator winding distribution, adjusted to generate the 12 cycle error harmonic correction, produces voltage harmonics in space in the order of 1, 31, 41, 43, 53, and others of higher order. The stator windings also produce certain even harmonics; however, these are of no consequence for the present purpose due to the bisymmetry of the rotor.

From the foregoing it will be noted that the lowest order harmonics common to both rotor and stator are the 31st and 43rd. The skew angle was adjusted to eliminate the lowest of these, the 31st.

Figure 3:
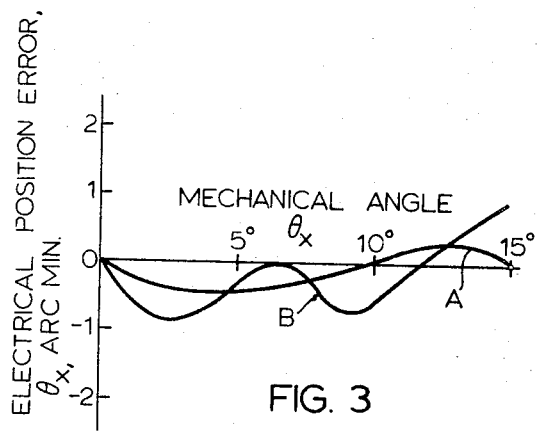

It would be expected, therefore, that the 43rd voltage harmonic would produce a 42nd harmonic error in the error curve and this is actually the case as will be seen from FIG. 3 wherein curve A is the calculated value of error that cannot be compensated for by means of the twelve cycle error harmonic correction and B is the value of error measured on an actual unit having optimum values of turns ratio unbalance (i.e., K) and twelve cycle error harmonic correction ($K_{11}$). (The unit had close to optimum values of K and $K_{11}$ for a no-load condition, which values were adjusted slightly in the final design to compensate for the effects of electrical load.) A comparison of curves A and B, FIG. 4, shows the error of the actual unit to deviate from the calculated error curve by an error component having approximately 1¾ cycles in 15 degrees which corresponds to a 42 cycle error harmonic. This is precisely as predicted and, therefore, it will be appreciated that, by taking into account the effects of the 43rd voltage harmonic in the calculation of error curve A of FIG. 3, quite close agreement between the calculated and measured data would be achieved.

It will also be noted from FIG. 3 that the residual error, i.e., error not compensated for by the turns ratio unbalance and the 12 cycle error harmonic correction, has approximately one cycle in 15 degrees or 24 cycles in 360 degrees. This residual error can be minimized by adding a 24 error cycle harmonic that could be generated by 23rd and/or 25th cycle voltage or winding harmonic by means of suitable winding distribution in the same manner as was done and explained hereinabove for the 12 cycle error harmonic correction. However, this would introduce, in addition to the 24th, other unwanted error harmonics just as the addition of the 11 cycle voltage harmonic introduced, inter alia, the unwanted 31st and 43rd error harmonics. Nevertheless, a net reduction in overall error may be achieved in this manner.

It should also be noted that the 42nd error harmonic evident in curve B of FIG. 3 can be eliminated by use of a different slot combination. An unwanted error harmonic would still exist as a by-product of the 11 cycle voltage harmonic; however, by judicious choice of slot combination, the unwanted harmonic could be made of higher order and, consequently, lower amplitude than the 42nd.

The following charts show the repetitive nature of the winding harmonic coupling factors. In particular, regardless of the winding distribution used, all harmonics listed in a given column have the same coupling factor, whatever its value may be.

| 16 Slot | | | | 2 Phase Rotor | | | | | |
|---|---|---|---|---|---|---|---|---|---|
| ↓ | | | | ↓ | | | | | |
| ① | 3 | 5 | 7 | 9 | ⑪ | 13 | 15 | 17 | 19 | 21 |
| 41 | 39 | 37 | 35 | 33 | ㉛ | 29 | 27 | 25 | 23 | |
| ㊸ | 45 | 47 | 49 | 51 | ㊷ | 55 | 57 | 59 | 61 | 63 |
| | | | | | | | 67 | 65 | | |

| 21 Slot | | 3 Phase Stator | |
|---|---|---|---|
| ↓ | | ↓ | |
| ① | 3 | 5 | 7 |
| 15 | 13 | ⑪ | 9 |
| 17 | 19 | 21 | 23 |
| ㉛ | 29 | 27 | 25 |
| 33 | 35 | 37 | 39 |
| 47 | 45 | ㊸ | 41 |
| 49 | 51 | ㊻ | 55 |
| | | 59 | 57 |

While the foregoing description deals with a specific synchro CX which has a distributed rotor winding, it will be apparent to those skilled in the art that the invention is applicable to synchros having salient pole rotors. In such a case, a given rotor will exhibit characteristic harmonics in its flux field and desired voltage harmonics in the CX output must then be achieved entirely by means of appropriate distribution of the stator windings.

The description also deals specifically with the application of the invention to the CX but it will be seen that it can be applied in principle to the CT and like devices.

While the present invention has been described in a preferred embodiment, it will be obvious to those skilled in the art that various modifications can be made therein within the scope of the invention, and it is intended that the appended claims cover all such modifications.

What is claimed is:

1. A fractional speed servo system comprising, in combination:
   a synchro-type transmitter unit having a rotor carrying an input winding and a stator carrying distributed multi-phase output windings; and
   a synchro-type control transformer unit having a rotor carrying an output winding and a stator, said stator carrying distributed multi-phase input windings connected to respective output windings of the transmitter unit,
   the stator windings of at least one of said units being unbalanced by reason of differences in the number of effective turns thereof so as to cause the transformer unit rotor to displace angularly in response to correlative displacement of the transmitter unit rotor, the ratio of said transformer rotor displacement to said correlative transmitter rotor displacement being a non-integer over a limited range of such displacement,
   said windings being distributed to introduce, into the effective voltages controlling the transformer unit rotor, space harmonics effective to mitigate electrical errors occurring in said voltages over said limited range of displacement.

2. A fractional speed servo system according to claim 1, wherein at least one phase of the stator windings have resistive impedances higher than that of the remaining stator windings, the difference in impedance being such that the fundamental null voltage of the system is minimized.

3. A fractional speed servo system comprising, in combination:
   a synchro-type transmitter unit having a rotor carrying a single-phase input winding and a stator carrying distributed multi-phase output windings; and
   a synchro-type control transformer unit having a rotor carrying an output winding and a stator, said stator carrying distributed multi-phase input windings connected to respective output windings of said transmitter unit, the various phase windings of the transmitter unit stator being unbalanced by reason of differences in the number of effective turns thereof so as to produce respective output voltages calculated to cause over a limited range the transformer unit rotor to displace angularly, in response to correlative displacement of the transmitter unit rotor, through a distance which would approximate, with a small finite error, a predetermined fraction of the transmitter unit rotor displacement over said limited range, the windings of the transmitter unit being distributed to introduce into said output voltages space harmonics effective to mitigate said finite error over said limited range of correlative displacement.

4. A fractional speed servo system comprising, in combination:
   a synchro-type transmitter unit having a rotor carrying a distributed single-phase input winding and a stator carrying distributed three-phase output windings; and
   a synchro-type control transformer unit having a rotor and a stator, said stator carrying distributed three-phase input windings connected to respective output stator windings of said transmitted unit, the effective turns ratio of the windings of the transmitter unit stator being selected so that the respective output voltages $E_a$, $E_c$ of two of said windings are substantially equal and, individually, different from the output voltage, $E_b$, of the third of said stator windings of the transmitter unit, the value of the ratio $E_b/E_a$ and $E_b/E_c$ being selected so that the receiver unit rotor displaces angularly, in response to correlative displacement over a limited range of the transmitter unit rotor, through a distance which approximates, with a small finite error, a predetermined fraction of said limited range transmitter rotor displacement, said transmitter unit windings being distributed to introduce into said output voltages space harmonics effective to minimize said finite error occurring during said limited range correlative displaceemnt.

5. A servo system according to claim 4 wherein the distribution of said transmitter unit windings is adapted to introduce a particular voltage harmonic effective to produce an error of equal amplitude and opposite phase to the said finite error.

6. A servo system according to claim 5 wherein the skew angle of said transmitter unit is adjusted to minimize the lowest order voltage harmonic common to both the stator and rotor of said transmitter unit.

7. A servo system according to claim 6 wherein said two stator windings have resistive impedance values different from that of said third stator winding, the difference in impedance being such that the fundamental null voltage of the system is minimized.

8. A servo system according to claim 7 wherein the distribution of said transmitter unit windings are further adapted to introduce an additional voltage harmonic effective to further reduce any residual error not eliminated by said particular voltage harmonic.

9. A servo system according to claim 4 wherein the value of ratio $E_b/E_a$ and $E_b/E_c$ is substantially 1.39416 and the 11th voltage harmonic is introduced, the value of the ratio of the amplitude of the 11th voltage harmonic relative to the fundamental being substantially $-.000942$.

10. A method of designing a fractional speed synchro system including a synchro-type transmitter unit having a rotor carrying an input winding and a stator carrying distributed multi-phase output windings and a synchro-type control transformer unit having a rotor and a stator, the transformer unit stator carrying distributed multi-phase input windings connected to respective output windings of the transmitter unit, said method comprising the following steps:
   unbalancing the output voltages of the transmitter unit stator by changing the effective turns of at least one of the phase windings sufficient to cause fractional correlative displacement between said transmitter rotor and said transformer rotor over a limited range of transmitter rotor displacement;
   plotting a curve of electrical position error vs. transmitter unit mechanical rotor angle and determining therefrom the frequency of the electrical position error occurring over said limited range of transmitter rotor displacement; and
   distributing the windings of the transmitter unit to introduce into the output voltages thereof a space harmonic adapted to produce an electrical error of substantially equal amplitude and opposite phase as compared to the error determined from said curve.

11. A method of designing a fractional speed synchro system including a synchro-type transmitter unit having a rotor carrying an input winding and a stator carrying distributed multi-phase output windings and a synchro-type control transformer unit having a rotor and a stator, the transformer unit stator carrying distributed multi-phase input windings connected to respective output windings of the transmitter unit, said method including the steps of providing at least one phase of the stator windings of one of said units with a substantially different number of effective turns as compared to the remaining phases, the difference in effective turns being such as to cause a differential in the correlative displacement of said rotors over a predetermined portion of a full rotation cycle corresponding to said rotors, the ratio of transmitter unit rotor displacement to transformer unit rotor displacement being a non-integer during said correlative displacement.

12. A method of designing a fractional speed synchro system including a synchro-type transmitter unit having a rotor carrying an input winding and a stator carrying distributed three phase output windings and a synchro-type control transformer unit having a rotor and a stator, said receiver unit stator carrying distributed three phase input windings connected to respective output windings of said transmitter unit, said method comprising the following steps:

unbalancing the output voltages of the transmitter unit by changing the effective turns of one of the phase windings relative to the other two windings, the ratio of the voltage output of said one winding to the voltage output of either of the other windings individually being a constant, K;

plotting for a limited range of values of $\theta$ a curve of the equation $$\Delta\theta = \frac{(K+\frac{1}{2})\sin\alpha\cos\theta - 3/2\cos\alpha\sin\theta}{(K+\frac{1}{2})\sin\alpha\sin\theta + 3/2\cos\alpha\cos\theta}$$

where $\Delta\theta$ is the electrical error in radians, K is said constant, $\theta$ is the angular (mechanical) position of the transmitter unit rotor, and $\alpha$ is the correlative electrical angle desired and a non-integer;

determining by inspection of said curve the error in cycles for a full 360 degrees of rotation of the transmitter unit rotor;

plotting an additional error curve showing electrical position error vs. transmitter unit mechanical rotor angle for a transmitter unit having windings distributed to introduce into its output voltages a space harmonic adapted to produce an electrical error of substantially equal amplitude and opposite phase as compared to the error determined from the first said curve, in accordance with the formula $$\Delta\theta = \frac{[(K+\frac{1}{2})\sin\alpha\cos\theta - 3/2\sin\theta\cos\alpha + K_y(K+\frac{1}{2})\cos_y\theta\sin\alpha + 3/2\sin_y\theta\cos\alpha]}{[(K+\frac{1}{2})\sin\alpha\sin\theta + 3/2\cos\alpha\cos\theta]}$$

where y = the order of the space harmonic;

repeating the proceding step for various values of K and $K_y$ and selecting those values of K and $K_y$ which yield the most favorable error characteristic and calculating the rotor and stator winding distributions for said transmitter unit required to produce the selected value of K and $K_y$ while producing a minimum of other unwanted harmonics.

13. The method defined in claim 12 including the following additional steps:

constructing a prototype of the transmitter unit;

adding resistive impedance to at least one of the transmitter unit stator phase windings until the system's fundamental null voltage is minimized; and using higher resistance wire for winding said phase so as to incorporate said resistive impedance therein.

14. The method defined in claim 12 including the following additional steps:

constructing and testing a prototype unit; and further reducing errors exhibited by the unit by trial and error adjustment of the values of K and $K_y$.

15. A synchro control transmitter comprising a stator and a rotor, said stator having distributed three phase output windings, the number of effective turns in the winding of at least one phase being substantially different from the number in the remaining windings, the difference in effective turns being such as to produce scale factor differences in the output voltages of the respective phases whereby the ratio of the effective electrical angle of the output to the mechanical angle of the rotor, over a limited range, would approximate a predetermined non-integer, with a finite error, the windings of said transmitter being distributed to introduce space harmonics in said output mitigating said error.

References Cited

UNITED STATES PATENTS

| | | | |
|---|---|---|---|
| 2,796,568 | 6/1957 | Gray | 318—30 |
| 2,839,726 | 6/1958 | Demetriou | 336—120 XR |
| 2,866,969 | 12/1958 | Takeuchi et al. | 318—24 XR |
| 3,196,332 | 7/1965 | Branom et al. | 318—24 XR |

BENJAMIN DOBECK, *Primary Examiner.*